United States Patent
Kisu et al.

(10) Patent No.: US 6,846,990 B2
(45) Date of Patent: Jan. 25, 2005

(54) FLAT CIRCUIT MEMBER-INSTALLING STRUCTURE

(75) Inventors: Naomi Kisu, Shizuoka (JP); Toshiaki Mori, Shizuoka (JP); Akihiro Ishikawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/378,846

(22) Filed: Mar. 5, 2003

(65) Prior Publication Data

US 2003/0169576 A1 Sep. 11, 2003

(30) Foreign Application Priority Data

Mar. 7, 2002 (JP) .................................... P2002-061350

(51) Int. Cl.⁷ ................................................ H02G 1/00
(52) U.S. Cl. ................... 174/138 E; 174/72 E; 174/135; 174/235; 174/98; 174/97; 174/68.1
(58) Field of Search ............... 174/138 E, 68.1, 174/72 A, 135, 255, 98, 97

(56) References Cited

U.S. PATENT DOCUMENTS 3,681,516 A * 8/1972 Heinrichs et al. ....... 174/138 E

* cited by examiner

Primary Examiner—Dean A. Reichard
Assistant Examiner—Jinhee Lee
(74) Attorney, Agent, or Firm—Sughrue Mion, PLLC (57) ABSTRACT

An installation vertical groove (13) is formed in a circuit member-installing surface (12) of a resin-molded panel (11). Then, a flat circuit member (14) is inserted into the installation vertical groove, so that the flat circuit member is installed in such a manner that this flat circuit member stands in a direction perpendicular to the circuit member-installing surface. The installation vertical groove has opposed surfaces which are spaced from each other by a distance, corresponding to a thickness of the flat circuit member and are disposed perpendicularly to the circuit member-installing surface, and this installation vertical groove is formed to be disposed below the circuit member-installing surface.

11 Claims, 7 Drawing Sheets

FLAT CIRCUIT MEMBER-INSTALLING STRUCTURE

BACKGROUND OF THE INVENTION

This invention relates to a flat circuit member-installing structure for installing a flat circuit member on a resin-molded panel.

Figure 9:
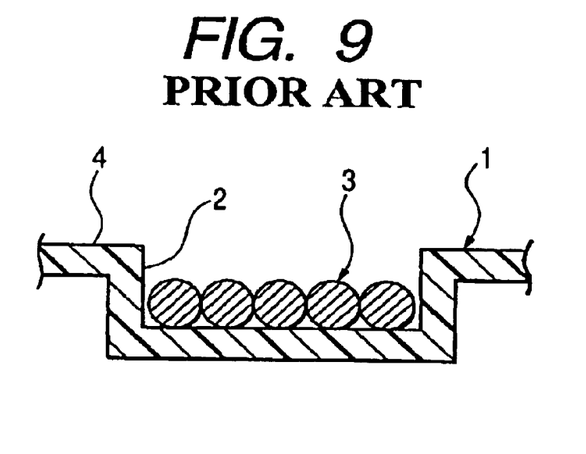
FIG. 9 is a cross-sectional view showing a conventional flat circuit member-installing structure.

FIG. 9 shows a commonly-known installing structure for installing a flat circuit member in a resin-molded panel, in which a groove 2 is formed in the resin-molded panel 1, and the flat circuit member 3 is received in this groove 2, thus effecting the flat installation (horizontal installation).

The groove 2 is formed by recessing a circuit member-installing surface 4 of the resin-molded panel 1. The groove 2 is formed such that its groove bottom portion is parallel to the circuit member-installing surface 4 and front and reverse surfaces of the flat circuit member 3. Further, the groove 2 is formed such that the spacing between its opposed groove side portions corresponds to the width of the flat circuit member 3.

Figure 10:
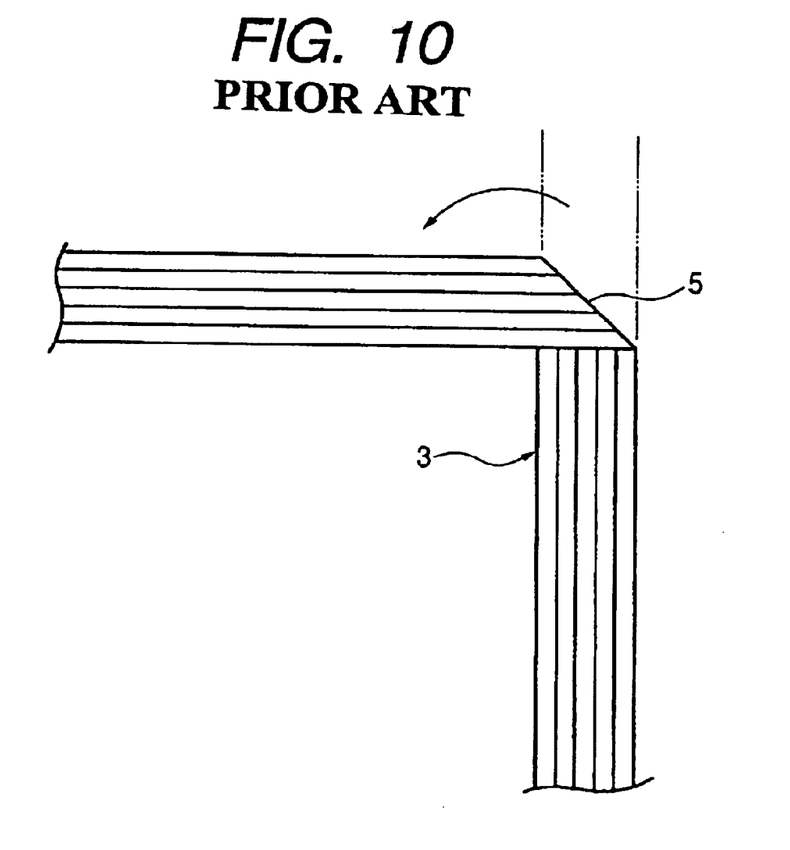
FIG. 10 is a plan view showing a condition in which a conventional flat circuit member is bent.

In the above technique, the path of installation of the flat circuit member 3 on the circuit member-installing surface 4 is not always straight, and therefore the flat circuit member 3 need to be folded and bent (see a bent portion 5) at an intermediate portion thereof as shown in FIG. 10, and as a result there is encountered a problem that the efficiency of the operation is affected (Increased time and labor are required for the operation.).

And besides, a reaction force, tending to restore the bent portion 5 into its original condition, develops at this bent portion 5, and therefore there arises a problem that the upper-side portion of the flat circuit member 3 is, in some cases, disengaged from the groove 2.

SUMMARY OF THE INVENTION

This invention has been made under the above circumstances, and an object of the invention is to provide a flat circuit member-installing structure in which the efficiency of an installing operation is good, and besides the installed condition is stable.

In order to solve the aforesaid object, the invention is characterized by having the following arrangement.

(1) A flat circuit member-installing structure for installing a flat circuit member at a resin-molded panel comprising:
the resin-mold panel defining a circuit member-installing surface; and
vertical installation means formed at the circuit member-installing surface for installing the flat circuit member therein in such a manner that the flat circuit member stands in a direction perpendicular to the circuit member-installing surface.

(2) The flat circuit member-installing structure according to (1), wherein the vertical installation means is an installation vertical groove having opposed surfaces which are spaced from each other by a distance substantially corresponding to a thickness of the flat circuit member and are disposed perpendicularly to the circuit member-installing surface.

(3) The flat circuit member-installing structure according to (2), wherein a retaining projection for preventing the withdrawal of the flat circuit member from the installation vertical groove is formed integrally on the installation vertical groove.

(4) The flat circuit member-installing structure according to (2), wherein a holding projection for reducing a gap between the opposed surface of the installation vertical groove and the flat circuit member is formed integrally on the installation vertical groove portion.

(5) The flat circuit member-installing structure according to (2), wherein a path formed by the installation vertical groove is meandering when viewed from the top.

(6) The flat circuit member-installing structure according to (1), wherein the flat circuit member kept standing in the perpendicular direction has a generally straight shape or a generally V-shape when viewed in a transverse cross-section of the flat circuit member.

(7) A flat circuit member-installing structure for installing a flat circuit member at a resin-molded-panel comprising:
the flat circuit member including a plurality of wires juxtaposed in a row in an integral manner;
the resin-molded panel defining a circuit member-installing surface; and
a groove defined by opposed side surfaces substantially perpendicular to the circuit member-installing surface, and a groove bottom portion, wherein depth from the circuit member-installing surface to the groove bottom portion is equal to or larger than a width of the flat circuit member defined by the plurality of wires, and gap between the opposed side surfaces is smaller than the width of the flat circuit member so that when the flat circuit member is installed in the groove, the flat circuit member stands on the groove bottom portion.

(8) The flat circuit member-installing structure according to (7), wherein the gap between the opposed side surfaces is set substantially equal to thickness of the flat circuit member.

(9) A flat circuit member-installing structure for installing a flat circuit member at a resin-molded panel comprising:
the flat circuit member including a plurality of wires juxtaposed in a row in an integral manner;
the resin-molded panel defining a circuit member-installing surface;
a groove defined by opposed side surfaces substantially perpendicular to the circuit member-installing surface, and a groove bottom portion,
wherein the flat circuit member is installed in the groove in such a manner that the flat circuit member is bent along the wires in V-shape in the cross section, and a bent portion of the flat circuit member is disposed at a side of the groove bottom portion.

(10) The flat circuit member-installing structure according to (9), wherein depth from the circuit member-installing surface to the groove bottom portion is equal to or larger than a half of width of the flat circuit member defined by the plurality of wires.

(11) The flat circuit member-installing structure according to (9), wherein opposite side edge portions of the flat circuit member in width direction act on the opposed side surfaces, respectively, thereby preventing the withdrawal of the flat circuit member from the groove.

DETAILED DESCRIPTION OF PREFERRED EMBODIMENTS

A preferred embodiment of the present invention will now be described with reference to the drawings.

Figure 1:
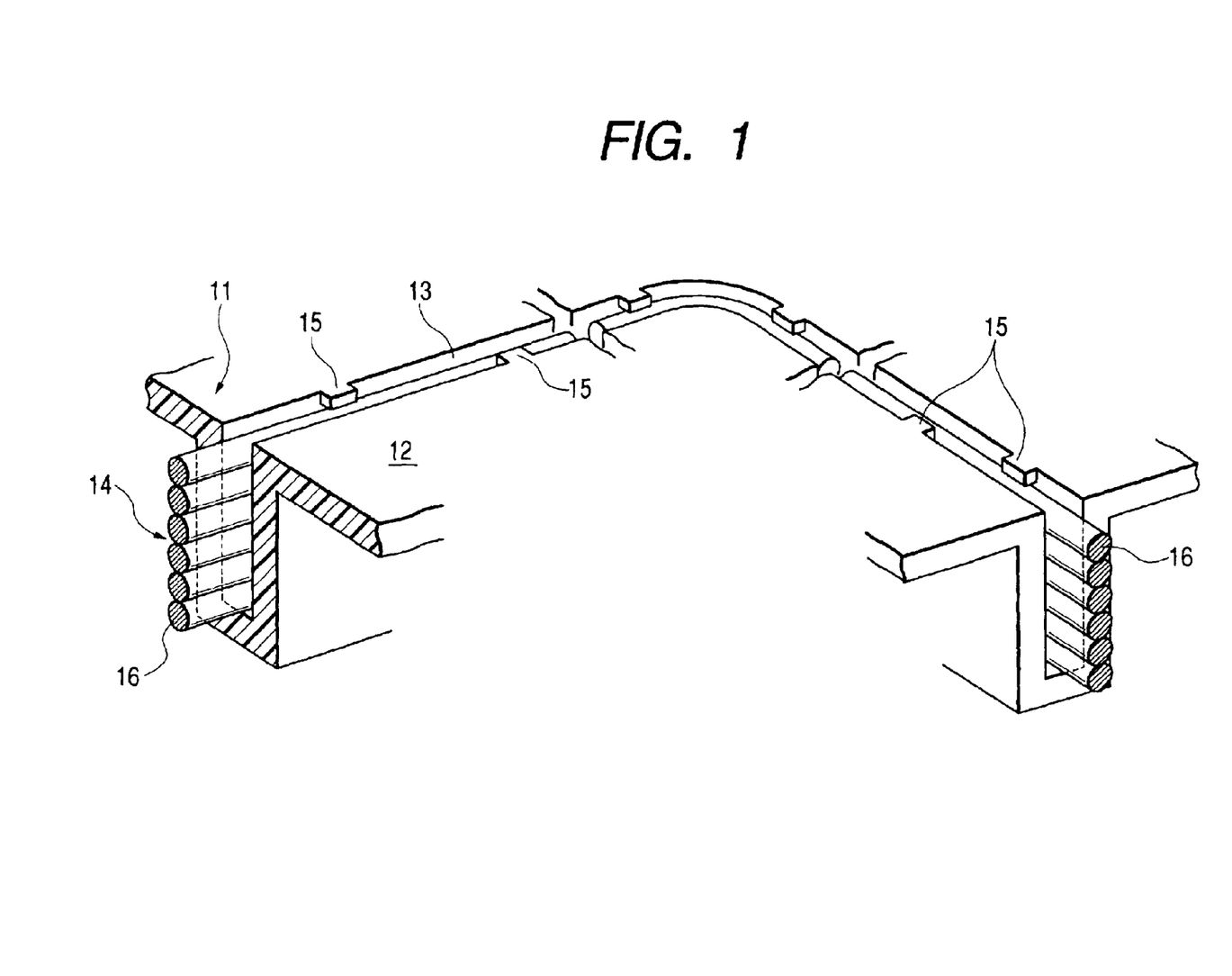
FIG. 1 is a perspective view showing one preferred embodiment of a flat circuit member-installing structure of the present invention.
Figure 2:
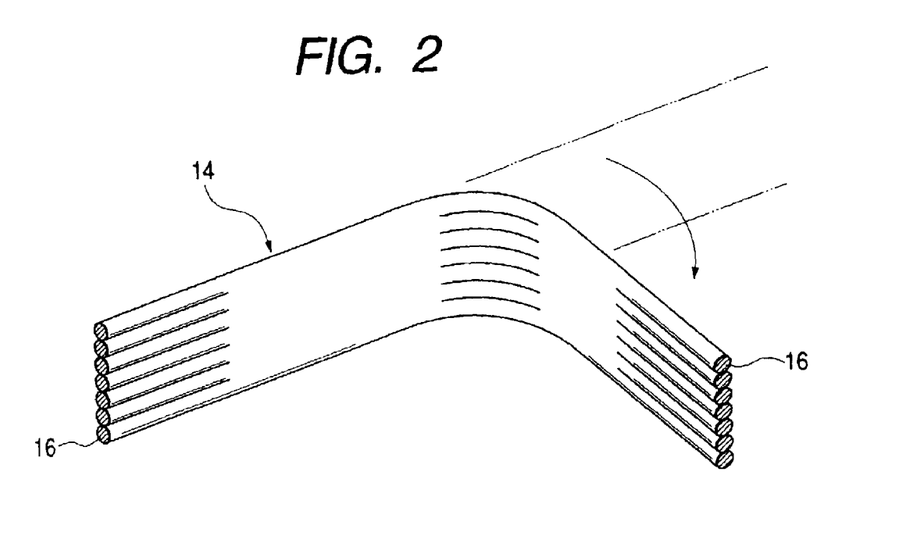
FIG. 2 is a perspective view of a flat circuit member bent into an arcuate shape at an intermediate portion thereof in accordance with an installation path.

FIG. 1 is a perspective view showing one preferred embodiment of a flat circuit member-installing structure of the invention. FIG. 2 is a perspective view of a flat circuit member bent into an arcuate shape at an intermediate portion thereof in accordance with an installation path.

Examples of a resin-molded panel include a vehicle panel such as a door inner panel and an instrument panel. Such examples further include resin-molded panels (including a resin-molded box-like body) used in home electrical appliances, production apparatuses and so on in which a flat circuit member is installed. Examples of the flat circuit member include an FPC and an FFC (having a flat conductor) in addition to those described below.

In FIGS. 1 and 2, the flat circuit member-installing structure according to the invention is characterized in that the flat circuit member 14 is inserted into an installation vertical groove 13 formed in a circuit member-installing surface 12 of a resin-molded panel 11, so that the inserted flat circuit member 14 is installed in a standing condition, that is, the flat circuit member 14 is installed (vertically installed) in such a manner that this flat circuit member 14 stands in a direction perpendicular to the circuit member-installing surface 12. The above constructions of one preferred embodiment will be described sequentially below.

The resin-molded panel 11 is produced, for example, by vacuum molding which is a kind of plastics molding method (The production method is not limited to the vacuum molding, and injection molding or others can be used.) The resin-molded panel 11 is molded into a shape corresponding to its use. In this embodiment, for better understanding, the circuit member-installing surface 12, in which the flat circuit member 14 is installed, is shown as a horizontal flat surface. The portion of the resin-molded panel 11, having the circuit member-installing surface 12, is required to have a strength corresponding to the use, and the wall thickness of this portion is set to an arbitrary value.

The installation vertical groove 13 is a vertical groove which is recessed downwardly in a direction (which is a vertical direction) perpendicular to the circuit member-installing surface 12, and is formed along the path of installation of the flat circuit member 14. The installation vertical groove 13 is formed such that its depth to its groove bottom portion is larger than the width of the flat circuit member 14. Further, the installation vertical groove 13 is formed such that the spacing between its opposed groove side portions (corresponding to "the perpendicularly-disposed surfaces" recited in the appended claims) corresponds to the thickness of the flat circuit member 14, that is, the diameter of each wire 16 (described later) of the flat circuit member 14. In this embodiment, the installation vertical groove 13 is formed such that its path is bent at an angle of 90 degrees at its intermediate portion (This path is one example.).

The groove side portions of the installation vertical groove 13 have the function of holding the installed flat circuit member 14, and also have the function of stabilizing the installed condition. A plurality of retaining projections 15 are formed integrally on upper ends of the groove side portions of the installation vertical groove 13, and project in the horizontal direction. The retaining projections 15 are the projections for preventing the withdrawal of the installed flat circuit member 14, and in this embodiment these retaining projections are arranged with regularities such as an right-left alternate arrangement when viewed from the top.

The flat circuit member 14 includes the plurality of wires 16 juxtaposed in a row (in a straight condition) in an integral manner, and has such flexibility that its surfaces (front and reverse surfaces) can be bent or curved. Preferably, the circuit member, when curved, produces a reaction force tending to restore it into its original condition. Each of the wires 16 includes a conductor, and an insulating member covering this conductor. In this embodiment, the flat circuit member 14, when to be installed, is curved or bent at its intermediate portion at an angle of 90 degrees in accordance with the path of the installation vertical groove 13 (see FIG. 2).

In the above construction, the flat circuit member 14 is set to stand in a direction perpendicular to the circuit member-installing surface 12 in such a manner that its intermediate portion is curved at the angle of 90 degrees in accordance with the path of the installation vertical groove 13 (see FIG. 2), and thereafter the flat circuit member 14 is inserted at one time or gradually into the installation vertical groove 13 along the installation path, thus completing the installation operation.

The flat circuit member 14 is installed relatively perpendicular to the circuit member-installing surface 12 of the resin-molded panel 11 in contrast with the conventional structure in which the flat circuit member is installed parallel (flat) relative to the circuit member-installation surface. Merely by curving the flat circuit member 14 into an arcuate shape in accordance with the path of the installation vertical groove 13 and then by inserting this flat circuit member into the installation vertical groove 13, the flat circuit member 14 can be easily installed along the desired installation path. Namely, the flat circuit member 14 can be easily installed along the desired installation path without effecting the conventional bending (folding) operation in which the circuit is bent in such a manner that the flat circuit member is folded upon itself at the bent portion. And besides, when the flat circuit member 14 is inserted into the installation vertical groove 13, the flat circuit member 14 is prevented from fluttering, and is less liable to be withdrawn since this installation vertical groove 13 is the vertical groove.

As described above, in the above flat circuit member-installing structure of the invention, it will be appreciated that the efficiency of the installing operation is good and that the installed condition after the installation is stable.

In the above embodiment, although the retaining projections 15 are provided on the installation vertical groove portion 13, the following modification can be made. Namely, the provision of the retaining projections 15 can be omitted. For example, if the circuit member-installing surface 12 does not vibrate in the above perpendicular direction, there is no need to provide the retaining projections 15 (In this case, the depth of the installation vertical groove 13 can be reduced.).

Figure 3:
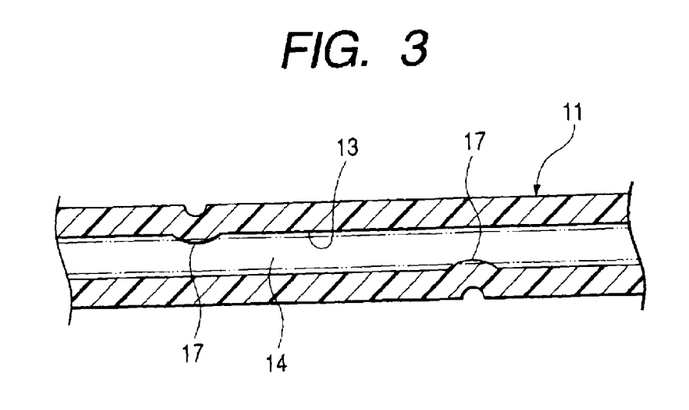
FIG. 3 is a horizontal cross-sectional view showing another example of installation vertical groove.

The following modification can be made. Namely, holding projections 17 as shown in FIG. 3 can be formed integrally on the installation vertical groove portion 13 regardless of whether or not the retaining projections 15 are provided. The holding projections 17 function to hold the inserted flat circuit member 14 on the groove side portions to more positively prevent the fluttering and withdrawal of the flat circuit member (that is, to reduce the gap between the groove side portion and the flat circuit member 14), and in FIG. 3, each of these holding projections is in the form of a rib extending in the above perpendicular direction.

Figure 4:
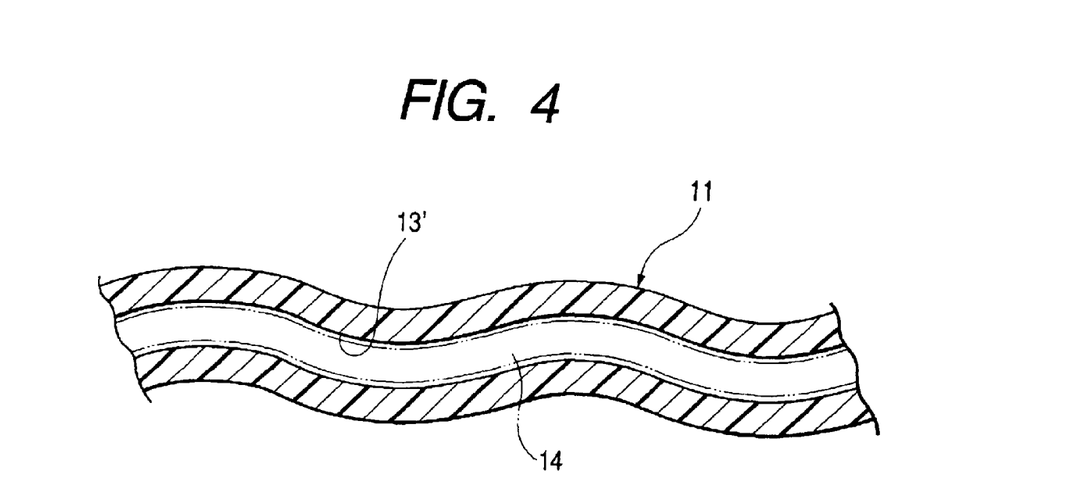
FIG. 4 is a horizontal cross-sectional view showing a further example of installation vertical groove.

Further, the following modification can be made. Namely, regardless of whether or not the retaining projections 15 are provided, the path of the installation vertical groove 13 is changed to a meandering path for an installation vertical groove 13' as shown in FIG. 4. As a result of providing the installation vertical groove 13' having such a meandering path, a reaction force, tending to restore the installed flat circuit member 14 into its original straight condition, develops in this flat circuit member 14. This reaction force acts to hold the flat circuit member in intimate contact with groove side portions of the installation vertical groove 13', so that the withdrawal of the flat circuit member 14 is prevented.

Figure 5:
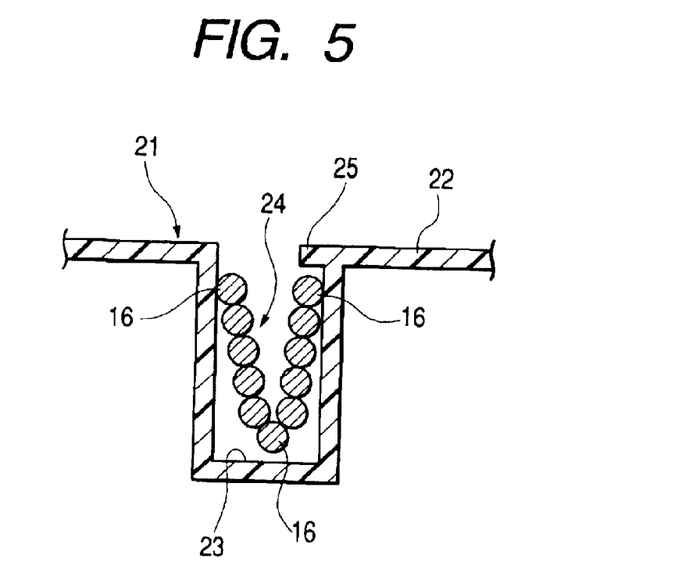
FIG. 5 is a vertical cross-sectional view showing another embodiment of a flat circuit member-installing structure of the invention.

Next, another embodiment of a flat circuit member-installing structure of the invention will be described with reference to FIG. 5. FIG. 5 is a vertical cross-sectional view showing this embodiment.

In FIG. 5, as in the above embodiment, the flat circuit member-installing structure of the invention is characterized in that a V-shaped flat circuit member 14 (as shown in this Figure) is inserted into an installation vertical groove 23 (serving as vertical installation means) formed in a circuit member-installing surface 22 of a resin-molded panel 21, so that the inserted V-shaped flat circuit member 24 is installed in a standing condition, that is, the V-shaped flat circuit member 24 is installed (vertically installed) in such a manner that this flat circuit member 24 stands in a direction perpendicular to the circuit member-installing surface 22. The above constructions of this embodiment will be described sequentially below.

The resin-molded panel 21 is produced, for example, by vacuum molding which is a kind of plastics molding method (The production method is not limited to the vacuum molding, and injection molding or others can be used.). The resin-molded panel 21 is molded into a shape corresponding to its use. In this embodiment, for better understanding, the circuit member-installing surface 22, in which the flat circuit member 24 is installed, is shown as a horizontal flat surface as in the above embodiment. That portion of the resin-molded panel 21, having the circuit member-installing surface 22, is required to have a strength corresponding to the use, and the wall thickness of this portion is set to an arbitrary value.

The installation vertical groove 23 is a vertical groove which is recessed downwardly in a direction (which is a vertical direction) perpendicular to the circuit member-installing surface 22, and is formed along a path of installation of the flat circuit member 24. The installation vertical groove 23 is formed such that its depth to its groove bottom portion is larger than ½ (in the case of this embodiment) of the width of the flat circuit member 24. Further, the installation vertical groove 23 is formed such that the spacing between its opposed groove side portions (corresponding to "the perpendicularly-disposed surfaces" recited in the appended claims) at least corresponds to the thickness of the flat circuit member 24, that is, the thickness of the flat circuit member 14 formed into the V-shape. For example, the installation vertical groove 23 has a path similar to the path of the installation vertical groove 13 (see FIG. 1).

The groove side portions of the installation vertical groove 23 have the function of holding the installed flat circuit member 24, and also have the function of stabilizing the installed condition. A plurality of retaining projections 15 are formed integrally on upper ends of the groove side portions of the installation vertical groove 23, and project in a horizontal direction. The retaining projections 15 are the projections for preventing the withdrawal of the installed flat circuit member 24, and in this embodiment these retaining projections are arranged with regularities such as an right-left alternate arrangement when viewed from the top.

As compared with the above-mentioned flat circuit member 14 (see FIG. 1), the flat circuit member 24 has a larger number of wires 16 (that is, a larger number of circuits), and this flat circuit member 24, when to be installed, is set in such a manner that the wires 16, disposed respectively at opposite side edges thereof, are moved toward each other about the central wire 16 (that is, set into a generally V-shape when viewed in a transverse cross-section). This flat circuit member, when to be installed, is curved or bent at its intermediate portion in the longitudinal direction at an angle of 90 degrees in accordance with the path of the installation vertical groove 23. The flexibility thereof is maintained.

In the above construction of this embodiment, the flat circuit member 24, kept in the V-shaped condition, is set to stand in a direction perpendicular to the circuit member-installing surface 22 in such a manner that its intermediate portion is curved at the angle of 90 degrees in accordance with the path of the installation vertical groove 23, and thereafter the flat circuit member 24, kept in the V-shaped condition is inserted at one time or gradually into the installation vertical groove 23 along the installation path, thus completing the installation operation.

The flat circuit member 24 is installed perpendicularly relative to the circuit member-installing surface 22 of the resin-molded panel 21 in contrast with the conventional structure in which the flat circuit member is installed parallel (flat) relative to the circuit member-installation surface. Merely by curving the flat circuit member 24, kept in the V-shaped condition, into an arcuate shape in accordance with the path of the installation vertical groove 23 and then by inserting this flat circuit member into the installation vertical groove 23, the flat circuit member 24 can be easily installed along the desired installation path. Namely, the flat circuit member 24 can be easily installed along the desired installation path without effecting the conventional bending (folding) operation in which the circuit is bent in such a manner that the flat circuit member is folded upon itself at the bent portion. And besides, when the flat circuit member 24 is inserted into the installation vertical groove 23, the flat circuit member 24 is prevented from fluttering, and is less liable to be withdrawn (The opposite side edge portions of the flat circuit member 24 are held in intimate contact with the groove side portions, respectively. As a result, the fluttering is avoided, and the withdrawal is prevented.) since this installation vertical groove 23 is the vertical groove.

As described above, in the above flat circuit member-installing structure of the invention, it will be appreciated that the efficiency of the installing operation is good and that the installed condition after the installation is stable. It will also be appreciated that when the number of the circuits is large and when it is desired to enhance the moldability of the vacuum molding, this structure is effective.

Figure 6:
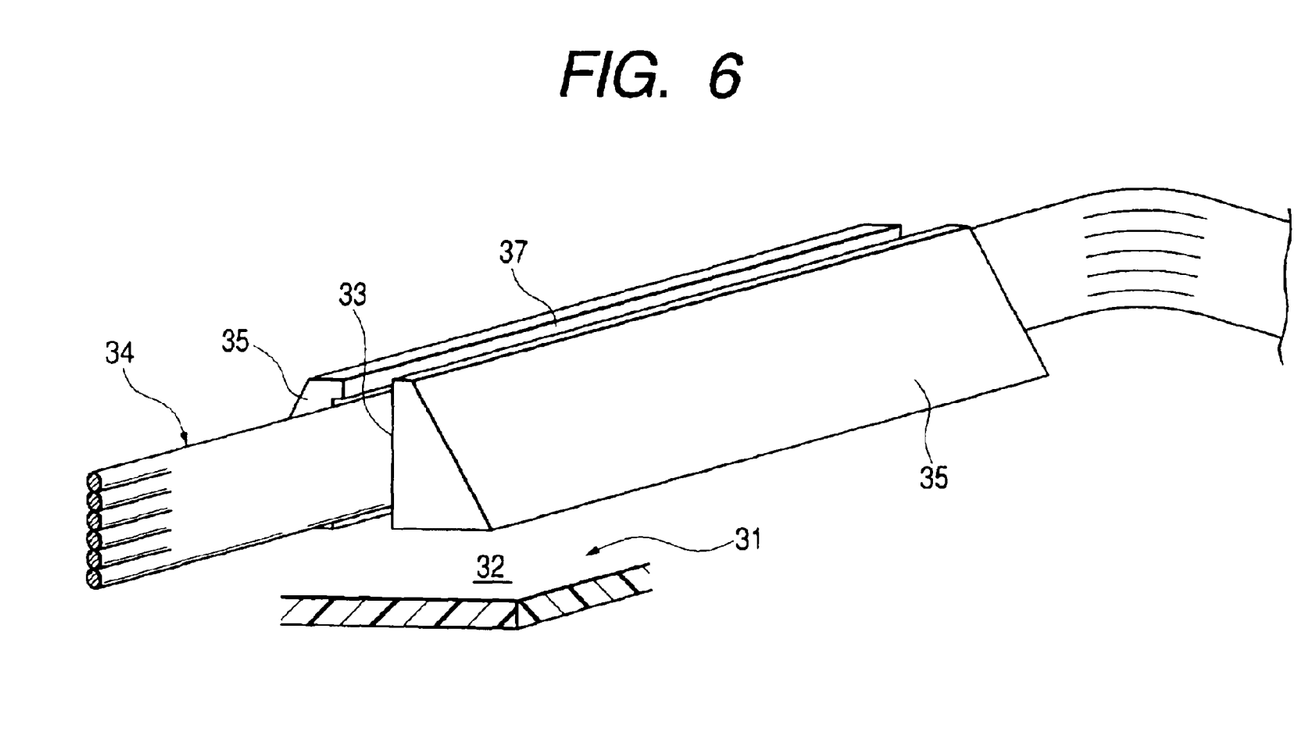
FIG. 6 is a perspective view showing a further embodiment of a flat circuit member-installing structure of the invention.

Next, a further embodiment of a flat circuit member-installing structure of the invention will be described with reference to FIGS. 6 and 7. FIG. 6 is a vertical cross-sectional view showing this embodiment, and FIG. 7A is a plan view of installation wall members, and FIG. 7B is a front-elevational view thereof.

Figure 7A:
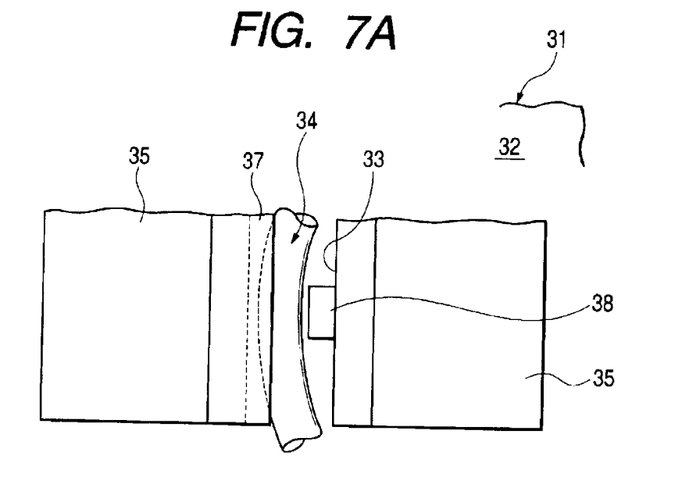
FIGS. 7A and 7B are a plan view and a front-elevational view, concerning installation wall members of FIG. 6, respectively.
Figure 7B:
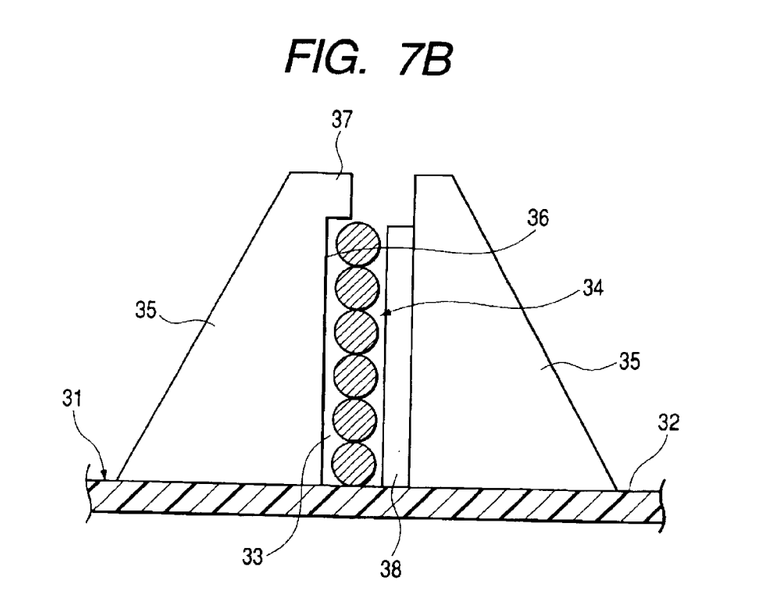

In FIGS. 6 and 7, the flat circuit member-installing structure of the invention is characterized in that a flat circuit member 34 is inserted into an installation vertical groove 33 (serving as vertical installation means) formed at a circuit member-installing surface 32 of a resin-molded panel 31, so that the inserted flat circuit member 34 is installed in a standing condition, that is, the flat circuit member 34 is installed (vertically installed) in such a manner that this flat circuit member 34 stands in a direction perpendicular to the circuit member-installing surface 32. The above constructions of this embodiment will be described sequentially below.

The resin-molded panel 31 is produced, for example, by vacuum molding which is a kind of plastics molding method. The resin-molded panel 31 is molded into a shape corresponding to its use. In this embodiment, for better understanding, the circuit member-installing surface 32, on which the flat circuit member 24 is installed, is shown as a horizontal flat surface. That portion of the resin-molded panel 31, having the circuit member-installing surface 32, is required to have a strength corresponding to the use, and the wall thickness of this portion is set to an arbitrary value.

The installation vertical groove 33 is a vertical groove which is provided between the installation wall members 35 and 35, formed on and projecting upwardly from the circuit member-installing surface 32 in a direction (which is a vertical direction) perpendicular to this circuit member-installing surface 32, and this groove 33 is formed along a path of installation of the flat circuit member 34. The installation vertical groove 33 is formed such that its depth to its groove bottom portion (the depth to the circuit member-installing surface 32) is larger than the width of the flat circuit member 34. Further, the installation vertical groove 33 is formed such that the spacing between circuit member-holding surfaces 36 and 36 (corresponding to "the perpendicularly-disposed surfaces" recited in the appended claims) of the installation wall members 35 and 35 corresponds to the thickness of the flat circuit member 34, that is, the diameter of each wire 16 (described later) of the flat circuit member 34. In this embodiment, the installation vertical grooves 33 are so formed and arranged as to provide a path in which the flat circuit member 34 is bent at an angle of 90 degrees at its intermediate portion (This path is one example).

The installation wall members 35 and 35 are generally box-like projected portions, and are formed on and project from the circuit member-installing surface 32 to form the installation vertical groove 33. The circuit member-holding surfaces 36 and 36 are flat surfaces, disposed in the above perpendicular direction, and have the function of holding the installed flat circuit member 34, and also have the function of stabilizing the installed condition. A retaining projection 37 is integrally formed on and projects horizontally from an upper end of one of the circuit member-holding surfaces 36, and a plurality of rib-like holding projections 38 are formed integrally on the other circuit member-holding surface 36, and extend in the above perpendicular direction. The retaining projection 27 is a generally claw-shaped projection for preventing the withdrawal of the installed flat circuit member 34, and in this embodiment this retaining projection is formed on the one installation wall member 35 over the entire length thereof in the direction of the installation path. The holding projections 38 reduce the gap between the circuit member-holding surface 36 and the flat circuit member 34, and serve to hold the inserted flat circuit member 34 against the circuit member-holding surface 36, thereby more positively preventing the fluttering and withdrawal of the flat circuit member.

The flat circuit member 34, like the above-mentioned flat circuit member 14 (see FIG. 1), comprises the plurality of wires 16 arranged or juxtaposed in a row (in a straight condition) in an integral condition, and has such flexibility that its surfaces (front and reverse surfaces) can be bent or curved. In this embodiment, the flat circuit member 14 is curved or bent at its intermediate portion at the angle of 90 degrees in accordance with the path of the installation vertical grooves 33.

In the above construction of this embodiment, the flat circuit member 34 is set to stand in a direction perpendicular to the circuit member-installing surface 32 in such a manner that its intermediate portion is curved at the angle of 90 degrees in accordance with the path of the installation vertical grooves 33, and thereafter the flat circuit member 34 is inserted at one time or gradually into the installation vertical groove 33 along the installation path, thus completing the installation operation.

The flat circuit member 34 is installed perpendicularly relative to the circuit member-installing surface 32 of the resin-molded panel 31 in contrast with the conventional structure in which the flat circuit member is installed parallel (flat) relative to the circuit member-installation surface. Merely by curving the flat circuit member 34 into an arcuate shape in accordance with the path of the installation vertical grooves 33 and then by inserting this flat circuit member into the installation vertical groove 33, the flat circuit member 34 can be easily installed along the desired installation path. Namely, the flat circuit member 34 can be easily installed along the desired installation path without effecting the conventional bending (folding) operation in which the circuit is bent in such a manner that the flat circuit member is folded upon itself at the bent portion. And besides, when the flat circuit member 34 is inserted into the installation vertical groove 33, the flat circuit member 24 is prevented from fluttering, and is less liable to be withdrawn since this installation vertical groove 33 is the vertical groove.

As described above, in the above flat circuit member-installing structure of the invention, it will be appreciated that the efficiency of the installing operation is good and that the installed condition after the installation is stable.

Figure 8:
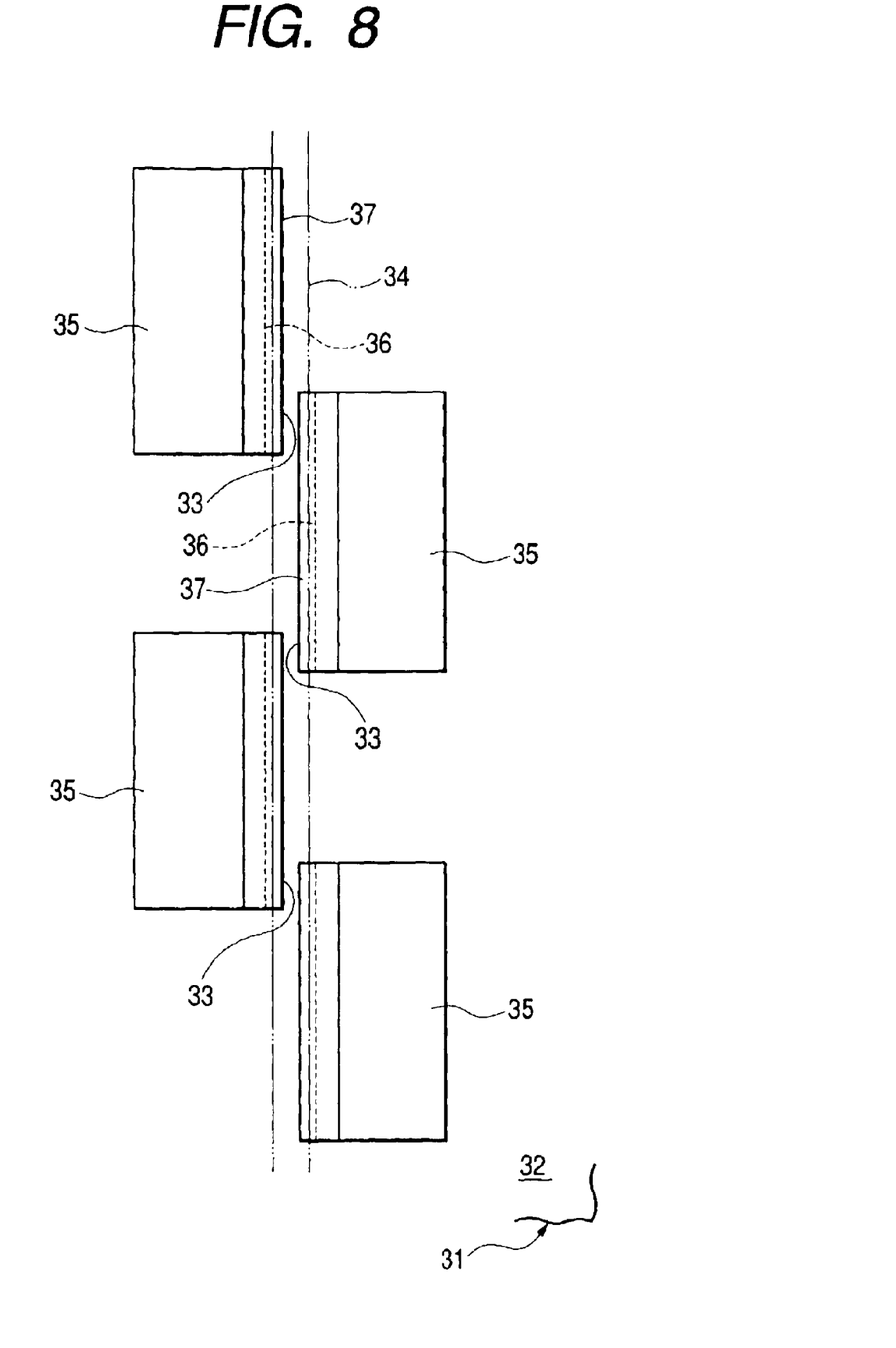
FIG. 8 is a plan view showing another arrangement of the installation wall members of FIG. 6.

To change the path of the installation vertical groove 13 to a meandering path (when viewed from the top), to omit the provision of the retaining projection 37 and/or the holding projections 38, and to change the shapes of these projections are suitably determined according to the use. The right and left installation wall members 35 can be alternately arranged in an overlapping manner as shown in FIG. 8.

Any other suitable modifications can be made without departing from the scope of the invention.

As described above, according to the invention, there is achieved an advantage that there can be provided the flat circuit member-installing structure in which the efficiency of the installation operation is good, and besides the installed condition is stable.

According to the invention, the vertical installation means is the installation vertical groove, and therefore there is achieved an advantage that the efficiency of the installing operation is enhanced. There is achieved another advantage that the installed condition is stable.

According to the invention, the retaining projection prevents the withdrawal of the flat circuit member, and therefore there is achieved an advantage that the installed condition of the flat circuit member can be made more stable. This projection is not separate from but is integral with the installation vertical groove portion, and therefore there is achieved another advantage that the number of the component parts and the cost can be reduced. The withdrawal of the flat circuit member is prevented, for example, without the use of an adhesive, and therefore there is achieved a further advantage that the disassembling and recycling abilities are high.

According to the invention, the holding projection holds the flat circuit member to prevent the withdrawal thereof, and therefore there is achieved an advantage that the installed condition of the flat circuit member can be made more stable. This projection is not separate from but is integral with the installation vertical groove portion, and therefore there is achieved another advantage that the number of the component parts and the cost can be reduced. The withdrawal of the flat circuit member is prevented, for example, without the use of an adhesive, and therefore there is achieved a further advantage that the disassembling and recycling abilities are high.

According to the invention, the flat circuit member is partly held in intimate contact with the perpendicularly-disposed surfaces of the installation vertical groove, and therefore there is achieved an advantage that the installed condition can be made more stable.

According to the invention, particularly when the flat circuit member has the V-shape, the opposite side edges of the flat circuit member are held in intimate contact with the perpendicularly-disposed surfaces by a reaction force, and therefore there is achieved an advantage that the installed condition can be made more stable.

What is claimed is:

1. A flat circuit member-installing structure for installing a flat circuit member at a resin-molded panel comprising:
   the resin-mold panel defining a circuit member-installing surface; and
   vertical installation means formed at the circuit member-installing surface for installing the flat circuit member therein in such a manner that the flat circuit member stands in a direction perpendicular to the circuit member-installing surface.

2. The flat circuit member-installing structure according to claim 1, wherein the vertical installation means is an installation vertical groove having-opposed surfaces which are spaced from each other by a distance substantially corresponding to a thickness of the flat circuit member and are disposed perpendicularly to the circuit member-installing surface.

3. The flat circuit member-installing structure according to claim 2, wherein a retaining projection for preventing the withdrawal of the flat circuit member from the installation vertical groove is formed integrally on the installation vertical groove.

4. The flat circuit member-installing structure according to claim 2, wherein a holding projection for reducing a gap between the opposed surface of the installation vertical groove and the flat circuit member is formed integrally on the installation vertical groove portion.

5. The flat circuit member-installing structure according to claim 2, wherein a path formed by the installation vertical groove is meandering when viewed from the top.

6. The flat circuit member-installing structure according to claim 1, wherein the flat circuit member kept standing in the perpendicular direction has a generally straight shape or a generally V-shape when viewed in a transverse cross-section of the flat circuit member.

7. A flat circuit member-installing structure for installing a flat circuit member at a resin-molded panel comprising:
   the flat circuit member including a plurality of wires juxtaposed in a row in an integral manner;
   the resin-molded panel defining a circuit member-installing surface; and
   a groove defined by opposed side surfaces substantially perpendicular to the circuit member-installing surface, and a groove bottom portion, wherein depth from the circuit member-installing surface to the groove bottom portion is equal to or larger than a width of the flat circuit member defined by the plurality of wires, and gap between the opposed side surfaces is smaller than the width of the flat circuit member so that when the flat circuit member is installed in the groove, the flat circuit member stands on the groove bottom portion.

8. The flat circuit member-installing structure according to claim 7, wherein the gap between the opposed side surfaces is set substantially equal to thickness of the flat circuit member.

9. A flat circuit member-installing structure for installing a flat circuit member at a resin-molded panel comprising:
   the flat circuit member including a plurality of wires juxtaposed in a row in an integral manner;
   the resin-molded panel defining a circuit member-installing surface;
   a groove defined by opposed side surfaces substantially perpendicular to the circuit member-installing surface, and a groove bottom portion,
   wherein the flat circuit member is installed in the groove in such a manner that the flat circuit member is bent along the wires in V-shape in the cross section, and a bent portion of the flat circuit member is disposed at a side of the groove bottom portion.

10. The flat circuit member-installing structure according to claim 9, wherein depth from the circuit member-installing surface to the groove bottom portion is equal to or larger than a half of width of the flat circuit member defined by the plurality of wires.

11. The flat circuit member-installing structure according to claim 9, wherein opposite side edge portions of the flat circuit member in width direction act on the opposed side surfaces, respectively, thereby preventing the withdrawal of the flat circuit member from the groove.

* * * * *